United States Patent
Hashimoto

[11] Patent Number: 6,130,417
[45] Date of Patent: Oct. 10, 2000

[54] AUTO-FOCUSING APPARATUS WITH HILL-CLIMBING AND FULL-SCANNING AUTO-FOCUSING PERFORMANCES

[75] Inventor: Hitoshi Hashimoto, Sagamihara, Japan

[73] Assignee: Olympus Optical Co., Ltd., Tokyo, Japan

[21] Appl. No.: 09/148,836

[22] Filed: Sep. 4, 1998

[30] Foreign Application Priority Data

Sep. 8, 1997 [JP] Japan ................................. 9-242882

[51] Int. Cl.⁷ .................................................. G02B 7/04
[52] U.S. Cl. .................................... 250/201.2; 250/201.7; 396/169
[58] Field of Search ............................. 250/201.2, 201.4, 250/201.5, 208.1, 201.7; 396/169, 164, 181, 168, 167, 166, 165, 95, 80; 348/345, 346, 363

[56] References Cited

U.S. PATENT DOCUMENTS 5,604,537  2/1997  Yamazaki et al. ....................... 348/350

Primary Examiner—Que T. Le
Attorney, Agent, or Firm—Frishauf, Holtz, Goodman, Langer & Chick, P.C.

[57] ABSTRACT

An auto-focusing apparatus comprises an image sensing element for photo-electrically converting an image focused by an focal lens into an image signal, an image sensing circuit for processing an image signal, an A/D converter for converting the image signal output from the image pickup circuit into a digital image signal, and an AE processing circuit and an AF processing circuit respectively for performing an automatic exposure process and an auto-focusing process, on the basis of the digital image signal, and determines the brightness of the subject on the basis of AE and AF evaluation values respectively obtained by the AE processing circuit and the AF processing circuit, and performs the auto-focusing process according to a hill-climbing AF method for a bright subject and the auto-focusing process according to the full-scanning AF method for a non-bright subject.

9 Claims, 10 Drawing Sheets

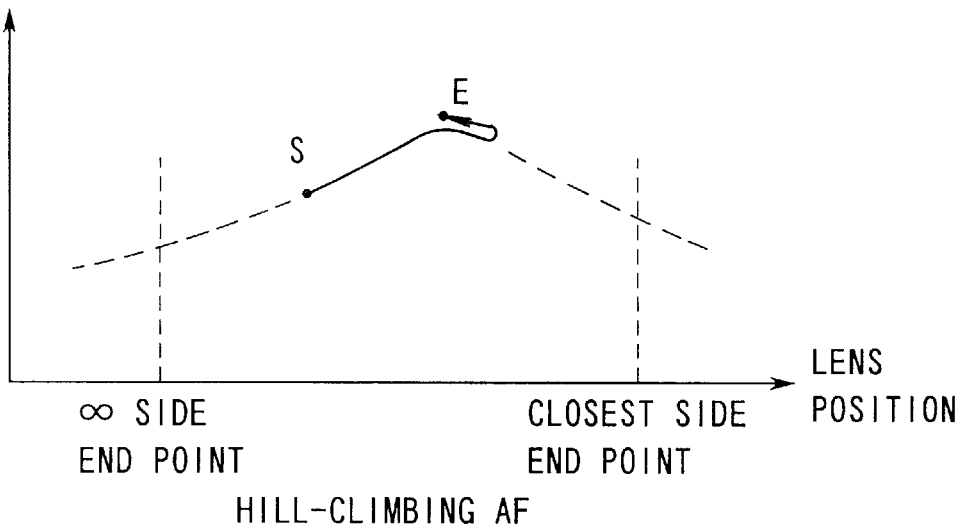
FIG. 2A  HILL-CLIMBING AF
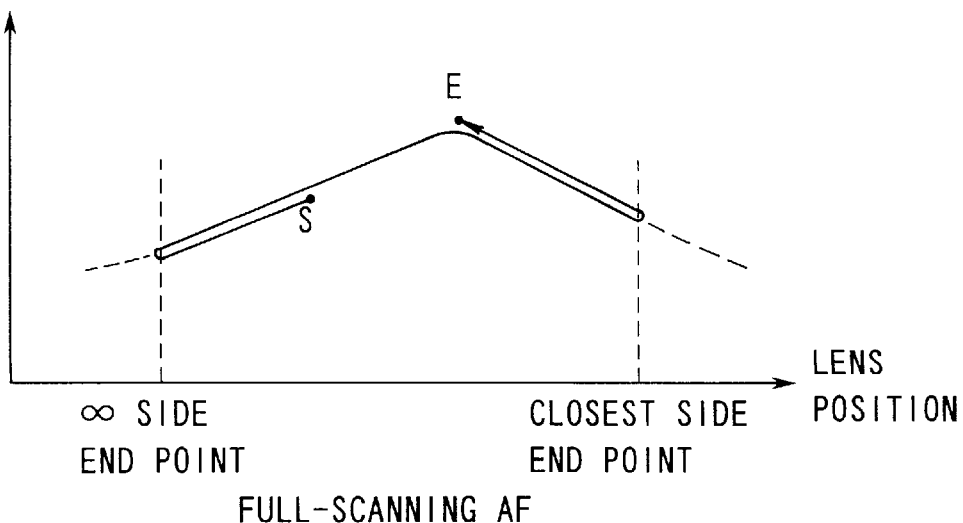
FIG. 2B  FULL-SCANNING AF

AUTO-FOCUSING APPARATUS WITH HILL-CLIMBING AND FULL-SCANNING AUTO-FOCUSING PERFORMANCES

BACKGROUND OF THE INVENTION

This invention relates to an auto-focusing apparatus used for auto-focusing an image-pickup optical system such as an electronic image pickup apparatus.

In recent years, some of electronic image pickup apparatus (e.g. a video camera) using an image sensing element are provided with an auto-focusing function to automatically focus an image pickup optical system at a focal position on the basis of the output of the image sensing element.

There has been developed an auto-focusing apparatus employing hill-climbing method or full-scanning method.

According to the hill-climbing method, an optical system can be easily focused at a focal position with high precision when the subject is bright. When the subject is dark, however, it is difficult to focus an optical system at a focal position with high precision.

BRIEF SUMMARY OF THE INVENTION

It is an object of the present invention to provide an auto-focusing apparatus capable of setting an optical system at a focal position with high precision irrelevant to the brightness of a subject.

The present invention provides an auto-focusing apparatus comprising a detection section for detecting a brightness of a subject by comparing the brightness of the subject with a predetermined brightness, and an auto-focusing section for performing an auto-focusing process according to a hill-climbing method when the brightness of the subject is higher than the predetermined brightness, and when the brightness of the subject is lower than the predetermined brightness, performing an auto-focusing process according to a full-scanning method.

According to the above structure, the auto-focusing apparatus selectively uses an auto-focusing method which can be regarded to be more suitable according to the brightness of the subject, and thus can perform a highly precise auto-focusing process irrelevant to the brightness of the subject.

The auto-focusing of the hill-climbing method is performed with having a priority over the auto-focusing of full-scanning method. In this time, when it is determined that the correct focus is disabled, the auto-focusing of full-scanning method is performed subsequently. As a result, the auto-focusing can be certainly performed.

According to the auto-focusing apparatus which switches the auto-focusing according to the hill-climbing method and that according to the full-scanning method according to the brightness of the subject, the moving distance of the focal lens for one frame is increased in the auto-focusing of the hill-climbing method since the auto-focusing of the hill-climbing method is intended to increase the processing speed, whereas since the auto-focusing of the full-scanning method is intended to improve the focusing precision, the moving distance of the focal lens for one frame is decreased. As a result, the auto-focusing can be performed at a high speed when the subject is bright, and the auto-focusing can be performed with a high precision, even when the subject is dark.

According to the auto-focusing apparatus which switches the auto-focusing processes according to the hill-climbing method and the full-scanning method according to the brightness of the subject, the auto-focusing of the hill-climbing method uses a flicker-less shatter, since it is performed for a bright subject, whereas the full-scanning method uses the lowest shutter speed, i.e., the shutter speed of a frame rate, since it performed for the dark subject. As a result, when the subject is bright, the auto-focusing affected by the flicker is enable. When the subject is dark, the information for auto-focusing is correctly obtained and the focusing precision is improved, so that an operability is improved.

According to the auto-focusing of the full-scanning method by which the scanning is performed also outside the effective focus detection range within which the auto-focusing is enabled, it is determined as an auto-focusing error when the maximum auto-focusing evaluation value is obtained at an end point or the adjacent point one step inner from the end point, thereby the spurious focusing can be prevented.

Further, by using the result of the moving average calculation of the auto-focusing evaluation values serially obtained from the AF processing section as an auto-focusing evaluation value, the auto-focusing process has sufficient resilience against noise, thereby the spurious focusing can be prevented.

According to the auto-focusing apparatus employing the full-scanning method, by using the result of the moving average calculation of the auto-focusing evaluation values serially obtained from the AF processing section as an auto-focusing evaluation value, the auto-focusing process has sufficient resilience against noise, thereby the spurious focusing can be prevented.

According to the auto-focusing apparatus employing the hill-climbing method wherein the moving direction of a lens is known, the result of the moving average calculation of the auto-focusing evaluation values serially obtained from the AF processing section is used as an auto-focusing evaluation value, with the result that the auto-focusing apparatus is sufficient resilience against noise and thus the spurious focusing can be prevented.

In addition to the use of the result of the moving average calculation of the auto-focusing evaluation values serially obtained from the AF processing section as an auto-focusing evaluation value, the positional deviation of the lens due to the moving average is corrected, that is, the positional deviation of the lens due to the moving average calculation is corrected, an optical system can be set at a highly precise focal position.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B schematically show the function of the auto-focusing according to hill-climbing method and full-scanning method employed in the first embodiment.

DETAILED DESCRIPTION OF THE INVENTION

Embodiments of the present invention will be described below with reference to the drawings.

Figure 1:
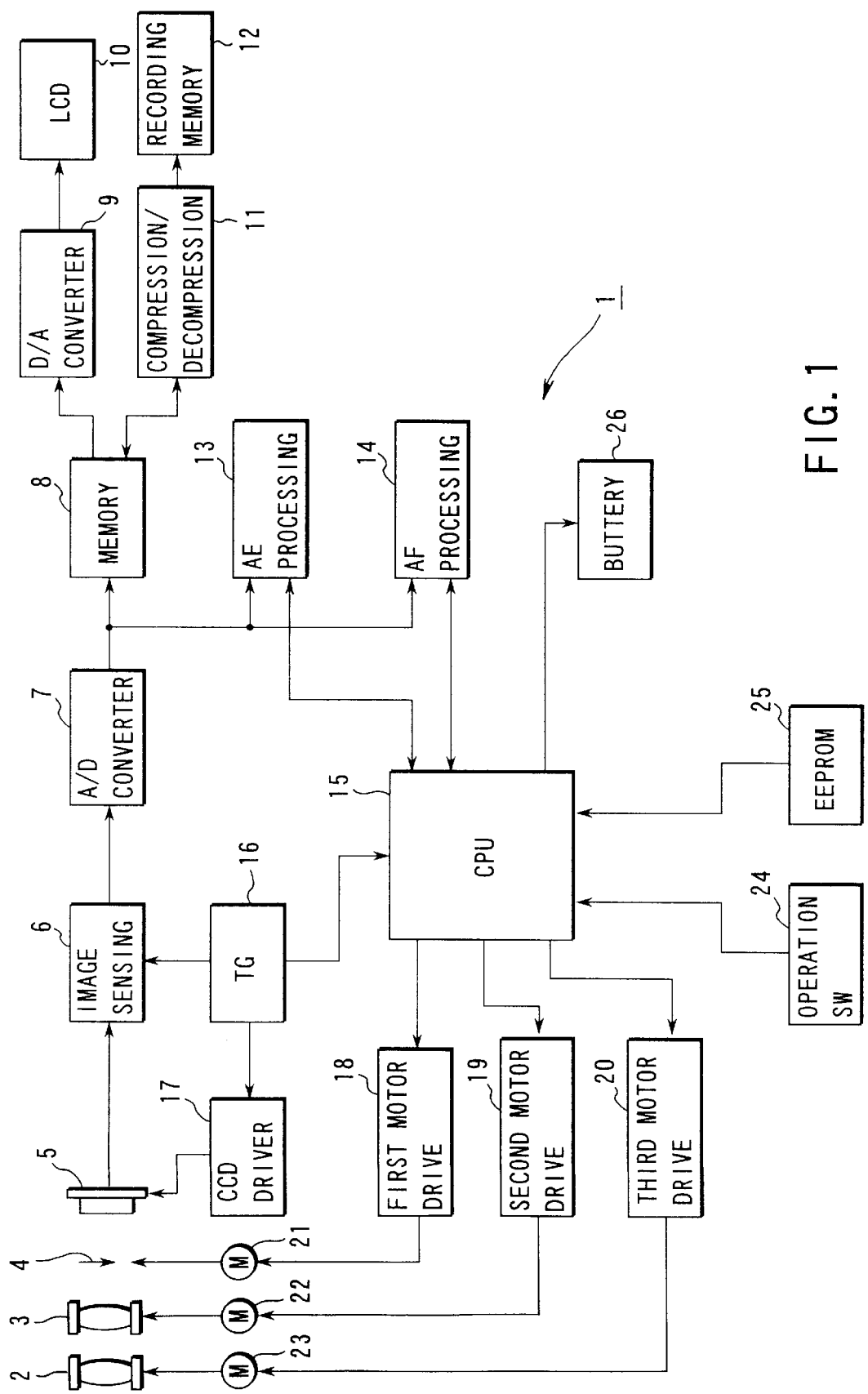
FIG. 1 is a block diagram showing an electronic image pickup apparatus having an auto-focusing apparatus according to the first embodiment of the present invention.

An electronic image pickup apparatus 1 shown in FIG. 1 comprises a zoom lens 2 and a focal lens 3 as an image pickup optical system. A light beam passes through these lenses and an iris 4, and enters into a CCD 5 as a solid state image sensor so as to form the image of a subject.

An electric signal obtained by photoelectric conversion of the CCD 5 is input into an image sensing circuit 6 to be output as an image signal. The output image signal is converted into a digital image signal (image data) by an A/D converter 7, and temporarily stored in a memory 8.

The image data stored in the memory 8 is read at a predetermined frame rate (1/30 second, for example) to be converted into an analog image signal by a D/A converter 9, then an image of the subject is displayed in a liquid crystal device (hereinafter referred to as "LCD") 10.

When the recording operation is performed by operation of a release switch on an operation switch 24, the image data stored in the memory 8 is compressed by a compression circuit in a compression/decompression circuit 11, and then stored in a recording memory 12.

When the reconstruction operation is carried out, the compressed data stored in the recording memory 12 is decompressed by a decompression circuit of the compression/decompression circuit 11, and then temporarily stored in the memory 8. The image data is converted into an analog image signal by the D/A converter 9, and then the reconstructed image data is displayed in the LCD 10.

The A/D converted image data by the A/D converter 7 is input into an automatic exposure processing circuit (hereinafter referred to as "AE processing circuit") 13 and an auto-focusing processing circuit (hereinafter referred to as "AF processing circuit") 14. The AE processing circuit 13 calculates an AE evaluation value suitable for the brightness of the subject by calculating the brightness of the image data of one frame (one picture) and so on, and output it to a CPU 15.

The AF processing circuit 14 extracts a high frequency component from the brightness component of the image data of one frame (one picture) by means of a high pass filter or the like, to calculate an accumulative value or the like, thereby obtains an AF evaluation value corresponding to the contour component amount on the high frequency side, or the like, and outputs it to the CPU 15.

The CPU 15 is also supplied with a predetermined timing signal from a timing generator (hereinafter referred to as "TG circuit") 16 in synchronization with the frame rate. The CPU 15 executes various control operations in synchronization with the timing signal.

The timing signal of the TG circuit 16 is also supplied to the image sensing circuit 6. In synchronization with the signal, a process such as a separation of color signals is performed.

Further, the TG circuit 16 controls a CCD driver 17 to drive the CCD 5 at a predetermined timing.

The CPU 15 controls first, second, and third motor driving circuits 18, 19, and 20 in order to drive the iris 4, the focal lens 3, and the zoom lens 2 by means of first, second, third motors 21, 22, and 23.

The CPU 15 controls the first motor driving circuit 18 on the basis of the AE evaluation value to rotate the first motor 21, thereby adjusts the f number of the iris 4 at a suitable value. In short, the automatic exposure control is performed.

The CPU 15 also controls the second motor driving circuit 19 on the basis of the AF evaluation value to rotate the second motor 22, thereby obtains the AF evaluation value from the AF processing circuit 14. On the basis of the obtained AF evaluation value, the CPU 15 causes the focal lens 3 to drive to the lens position at which the AF evaluation value is the maximum, thereby setting it to a focused state. In other words, the auto-focusing process is performed.

In the present embodiment, when the focal position is set by obtaining the AF evaluation value, the focal lens 3 is moved by the second motor 22 for a predetermined distance at the frame rate (1/30 second, for example) at which one frame (one picture) of the subject is sensed by the CCD 5. The focal lens 3 is moved by a predetermined distance within a movable range in the direction of its own optical axial.

According to the present embodiment, either of the auto-focusing of the hill-climbing method (hereinafter referred to as "hill-climbing AF") and the auto-focusing of the full-scanning method (hereinafter referred to as "full-scanning AF") is selectively employed as means for performing the auto-focusing in accordance with the brightness of the subject, as schematically shown in FIGS. 2A and 2B.

When a zoom-up switch in the operation switch 24 is operated, the CPU 15 controls the third motor driving circuit 20 in response to an operation signal supplied from the operation switch 24 to rotate the third motor 23, thereby drive the zoom lens 2 on a zoom-in side.

The CPU 15 is also connected to a EEPROM 25 as an electrically rewritable and non-volatile read-only memory. The EEPROM 25 stores programs for performing various control operations via the CPU 15, and data used for various operations. The program or data stored in the EEPROM 25 is read to be used at such a time when the image pickup apparatus 1 is turned ON.

The CPU 15 detects the voltage of a buttery 26. When the detected voltage is lower than a predetermined voltage value, the CPU 15 causes the LCD 10 to display a message for informing the user that the remaining quality of the buttery 26 is low, or the buttery should be charged or replaced.

The present embodiment is characterized in that the EEPROM 25 stores a program for determining which of the two auto-focusing processes should be used in an image pickup mode for performing an image pickup (image recording), in accordance with the brightness of the subject.

Next, the characterizing operation of the present embodiment will be described below with reference to a flow chart of FIG. 3. When the image pickup apparatus 1 is turned on and set to the image pickup mode, the process shown in a flow chart of FIG. 3 starts.

At first, an auto-exposure (merely indicated as "AE" in FIG. 3, similarly to the following drawings) process performed as indicated in step S1.

Next, as indicated in step S2, it is determined whether or not the first release operation (indicated as "1st release" in FIG. 3) of a release switch is performed, and the apparatus is set in a stand-by state to wait for the first release.

In the present embodiment, the release switch is a two-stage switch. In the first release operation in which the first release switch is turned on, the AE and AF processes are performed. By performing the second release operation in which the second release switch is turned ON, the image pickup is actually performed.

When the first release operation is performed, the brightness of the subject is compared with a predetermined brightness as a reference value in step S3 to determine whether or not the brightness of the subject is higher than the predetermined value. The predetermined brightness in this case is set at such a value that the hill-climbing AF can be performed with predetermined precision.

When the subject has higher brightness than the predetermined brightness, the information having good S/N ratio can be obtained, and thus the hill-climbing AF is performed in step S4.

When the brightness of the subject is determined in step S3 to be lower than the predetermined one, the full-scanning AF is performed in step S5.

After performing an auto-focusing according to either of the methods, it is determined in step S6 whether or not the first release is removed. When the removal of the first release is performed, the process backs to the first step S1. When the first release is not removed, it is determined in the next step S7 whether or not the second release operation (indicated as "2nd release" in FIG. 3) is performed. When the second release operation is not determined to be performed, the process backs to step S6.

After the second release operation is performed, an image pickup process is performed in step S8. In this process, the image data temporarily stored in the memory 8 in FIG. 1 is read to be stored in the recording memory 12 through the compression/decompression circuit 11. After performing the image pickup process, the process backs to step S1, and waits for the next image pickup operation.

Figure 4:
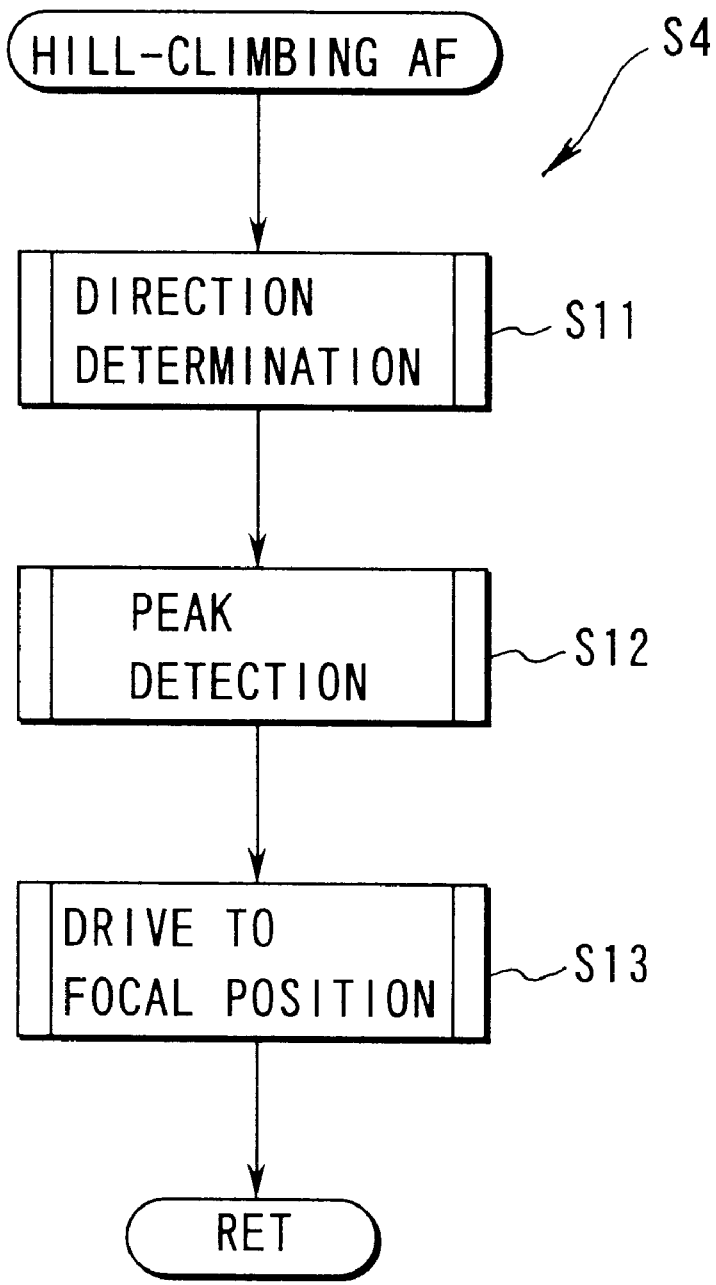
FIG. 4 is a flow chart representing the process according to the auto-focusing process according to the hill-climbing method.

The process contents of the hill-climbing AF in step S4 is shown in a flow chart of FIG. 4. According to this, the moving direction of the focal lens is determined in step S11. As shown in FIG. 2A, it is determined in which direction the lens performs hill-climbing, on the basis of the lens position at the start of the hill-climbing AF.

In FIG. 2, a ∞ side end point as one end point within the movable range of the focal lens 3 is located outside of the lens position of the focal lens 3 which has a focal point at ∞ (an infinity distance), and a closest side end point as the other end point is also located outside of the lens position of the focal lens 3 having a focal point at the closest point (more specifically, the ∞ side end point is located outside of ∞ (an infinity distance) as one end within the image pickup range, and the closest side end point as the other end side of the image pickup range is located outside of the closest point (60 cm in FIG. 10)).

In the direction determination process in step S1, the lens is moved by a predetermined distance toward the side of the end point (in FIG. 2A, the closest side end point) farther from the present lens position, and the CPU 15 obtains the AF evaluation value at the point where the lens is moved, from the AF processing circuit 14. The obtained AF evaluation value is compared with the AF evaluation value before the movement. It is determined that the direction in which the AF evaluation after the movement becomes larger is the direction in which the lens moved.

While the lens is moved in the determined direction by the predetermined distance, a peak detection is performed in step S12. Till a smaller AF evaluation value than that obtained before the movement is obtained on the side toward which the lens moved, in other words, till the curve of the AF evaluation value begins to describe downward from its peak (i.e., a peak of the AF evaluation value), the movement of the lens is repeated at the predetermined distance. The AF evaluation value is obtained till the curve begins to describe downward from the peak, whereby the peak AF evaluation value is detected.

When the peak AF evaluation value can be detected, the lens is driven toward the focal point in the next step S13. More specifically, the focal lens 3 is driven to the lens position at which the peak AF evaluation value is detected. FIG. 2A shows schematically the operation of the auto-focusing based on the hill-climbing AF wherein the movement of the focal lens 3 in which the focal lens 3 is moved from the starting position (indicated as a signal "S") in a direction to describe upward curve, and when the curve begins to describe downward from its peak (the peak of the AF evaluation value), the lens backs to the point at which the peak was obtained, and the process has finished at that time (as indicated as a signal "E").

Figure 5:
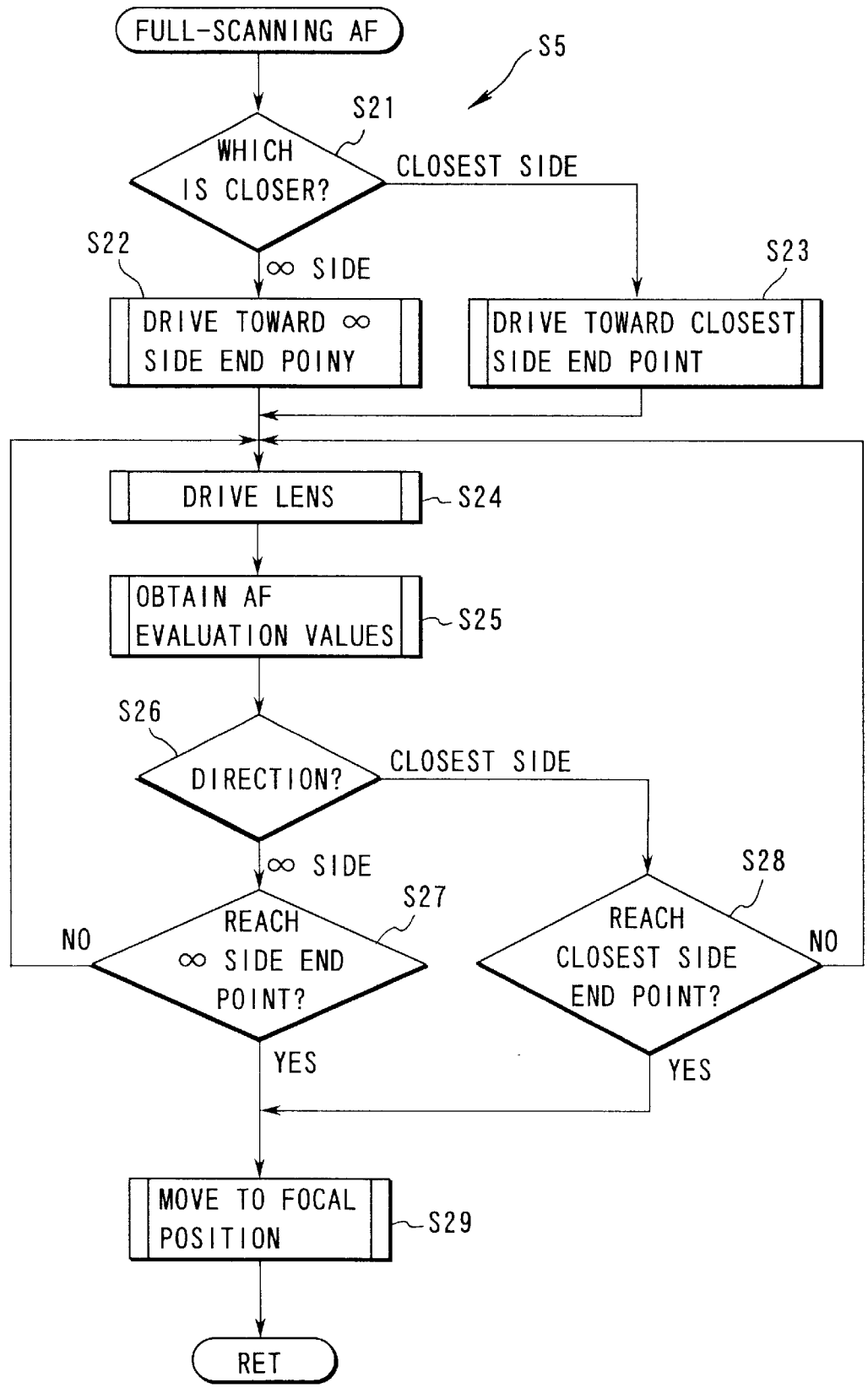
FIG. 5 is a flow chart representing the process according to the auto-focusing process according to the full-scanning method.

On the other hand, when the focusing is performed in accordance with the full-scanning AF, it is firstly determined by the CPU 15 which of the ∞ side end point and the closest end point is nearer to the present lens position, as shown in a flow chart of FIG. 5. When the lens position is determined to be nearer to the ∞ side end point, the lens is driven to the ∞ side end point, as indicated in step S22. When the lens position is determined to be nearer to the closest side end point, the lens is driven toward the closest side end point.

The ∞ side end point is located outside the lens position of the lens having a focal point at ∞ as described above, and the closest side end point is located outside the lens position of the lens having a focal point at the closest position.

After driving the lens to the determined end point, processes from step S24 to step S28 are repeated, the AF evaluation value is obtained while the lens is driven at the predetermined distance till the lens reaches from the closest side end point to the ∞ side end point, or from the ∞ side end point to the closest side end point.

In other words, as shown in step S24, the lens is driven at the predetermined distance (a moving distance equal to the stepping distance by which the lens moves for one frame), and the AF evaluation value at the moved point is obtained as shown in step S25. Next, the moving direction is detected in step S26. When the lens moves toward the ∞ side, it is determined in step S27 whether or not the lens reaches the ∞ side end point. When the lens is detected in step S26 to move in the direction toward the closest side end point, it is determined in step S28 whether or not the lens reaches the closest side end point. The processes are repeated till the lens reaches from one end point to the other end point.

After the processes are performed till the lens reaches from the one end point to the other end point, the process for driving the lens to the focal point is performed in the next step S29.

In other words, the lens is driven to the lens position at which the maximum AF evaluation value is obtained, thereby the camera is set in a focusing state. In this manner, the focusing process has finished by the full-scanning AF process shown in FIG. 5, and the process advances to step S6 in FIG. 3.

In the state shown in FIG. 2B, the lens position at the starting point is located near to the ∞ side end point, and thus the lens is firstly moved to the ∞ side end point. Subsequently, the lens is moved from the ∞ side end point to the closest side end point to obtain the AF evaluation value.

After scanning all the lens movable range, the lens is driven back to the point at which the maximum AF evaluation value was obtained, then the process has finished, as schematically shown in the drawing.

According to the present embodiment, when the subject is bright, the auto-focusing is performed in accordance with the hill-climbing AF. Accordingly, the auto-focusing can be performed at a high speed and with high precision. On the other hands, when the subject is dark, the full-scanning AF is performed. Although the full-scanning AF cannot perform the auto-focusing at a higher speed than the hill-climbing AF, high precision can be attained. In other words, a highly precise auto-focusing can be performed irrelevant to the brightness of the subject.

Figure 6:
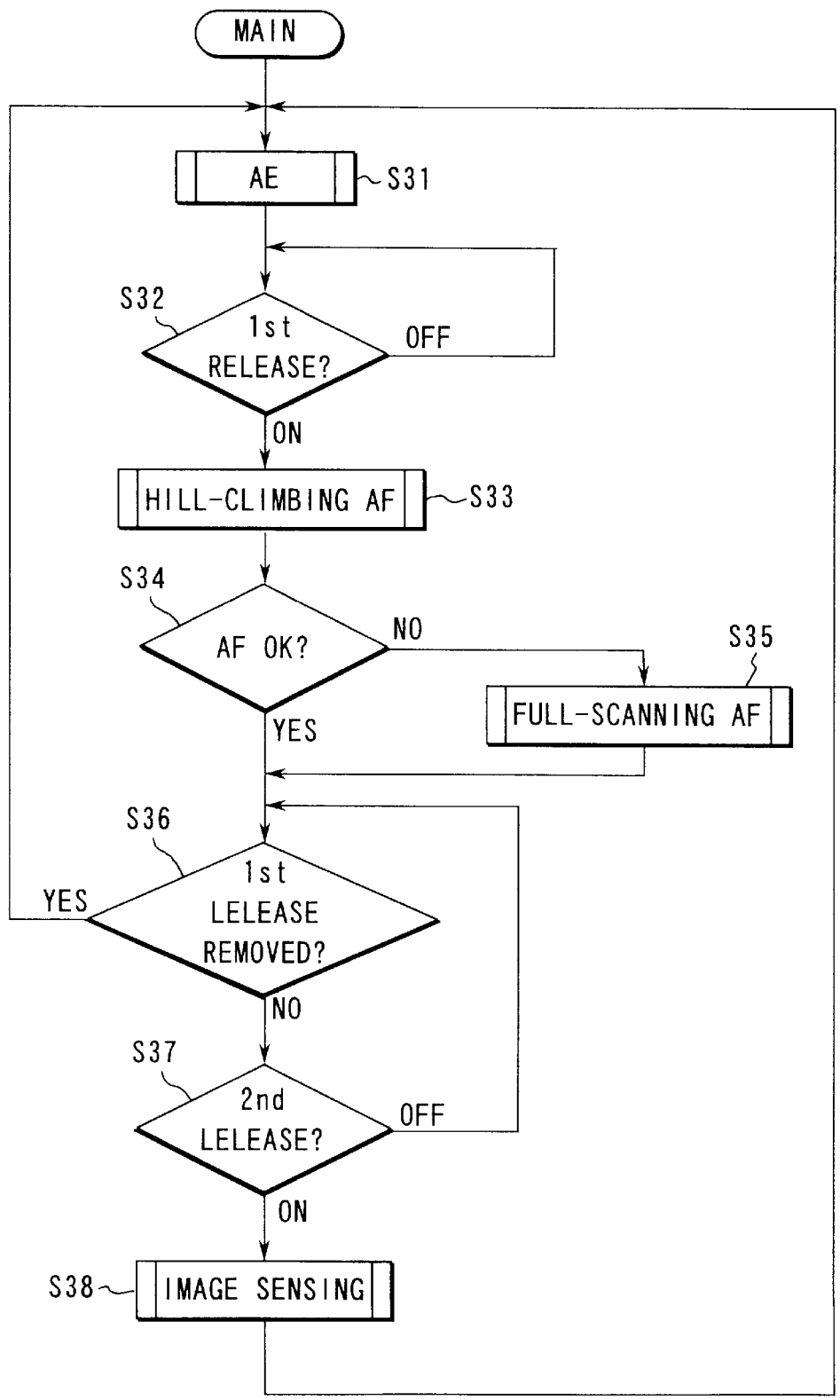
FIG. 6 is a flow chart representing the process according to the second embodiment of the present invention.

Next, the second embodiment of the present invention will be described below with reference to FIG. 6. In this embodiment, the hill-climbing AF is preferentially performed, and if the hill-climbing AF fails to be performed, the auto-focusing is performed by the full-scanning AF.

The structure according to the present embodiment has the same as that of the first embodiment, but the contents of the program stored in the memory differs therefrom. The operation of the present embodiment is shown in FIG. 6.

When the image pickup is started in this mode, the auto exposing process is firstly performed in step S31 in the similar manner to that in steps S1 and S2, then the apparatus is set in a stand-by mode till the first release operation is performed in step S32.

Next, the hill-climbing AF process is performed as indicated in step S33. After performing the hill-climbing AF process, it is determined whether or not the auto-focusing process is succeeded, as indicated in step S34.

When the auto-focusing is performed in success, the process advances to step S36. When the auto-focusing is performed in failure, it is performed in accordance with the full-scanning AF as shown in step S35.

In the next step S36, it is determined whether or not the first release operation is removed. When the first release operation is removed, the process backs to step S31. When the first release operation is not removed, it is determined in step S37 whether or not the second release operation is performed. When the second release operation is determined not to be performed, the process backs to step S36. When the second release operation is determined to be performed, the image pickup process is performed in the next step S38, and then the process backs to step S31 thereafter.

It is difficult for the conventional apparatus to focus the dark subject or the subject having poor contrast. According to the present embodiment, when the auto-focusing according to one method fails, the auto-focusing according to another method having a feature quite different from that of the former method (complimentary method for complementing to each other) is performed subsequently thereto. The auto-focusing therefore can be performed without fail.

Next, the third embodiment of the present invention will be described below with reference to FIG. 7. According to the present embodiment, the methods of the auto-focusing are switched in accordance with the brightness of the subject basically similarly to the first embodiment. Since the hill-climbing AF intends the increase of the focusing speed, the moving distance of the focal lens 3 for one frame is increased. In contrast, since the full-scanning AF as the other of the methods is mainly intended to improve the precision, the moving distance of the focal lens 3 for one frame is decreased.

Figure 3:
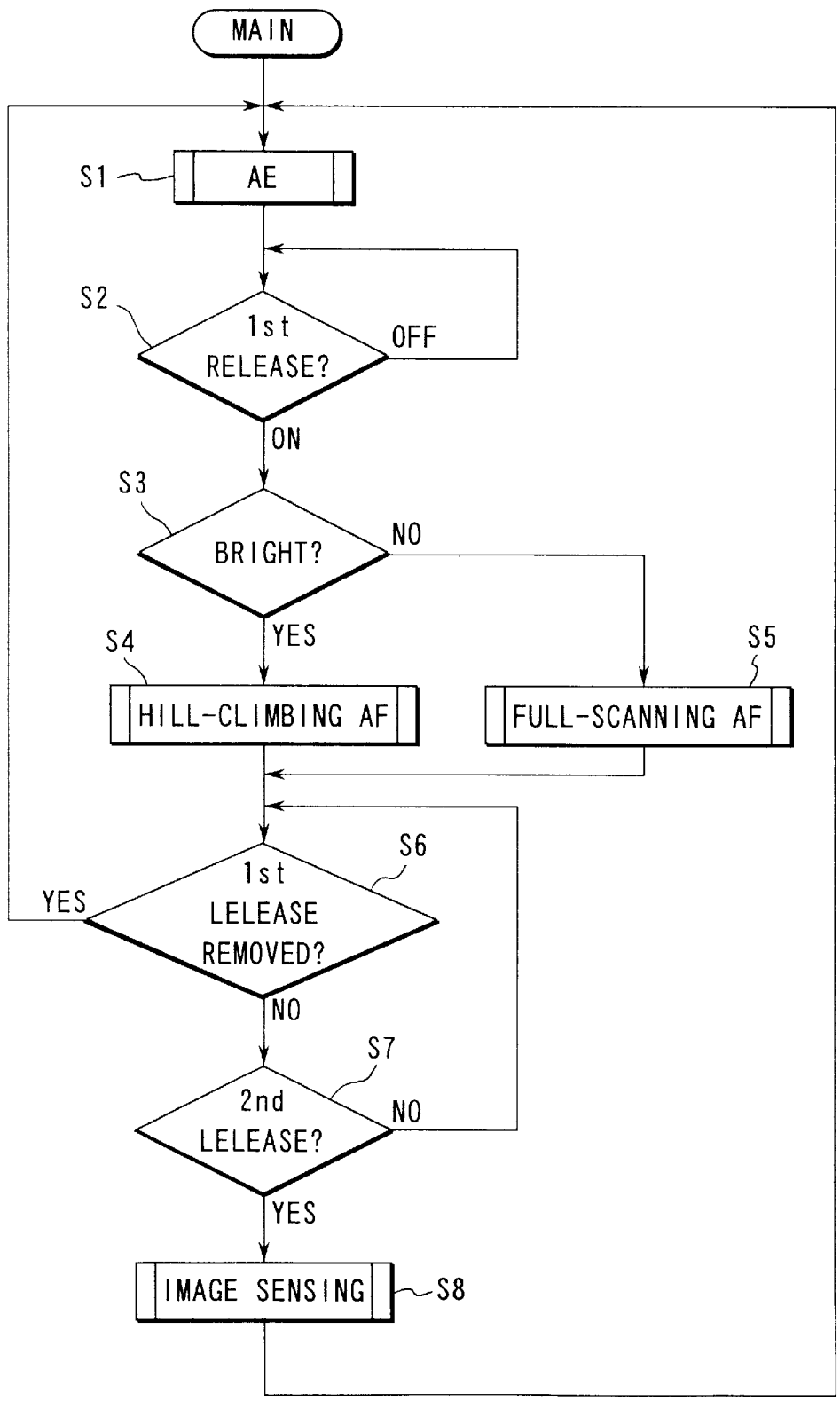
FIG. 3 is a flow chart representing the process according to the first embodiment.
Figure 7:
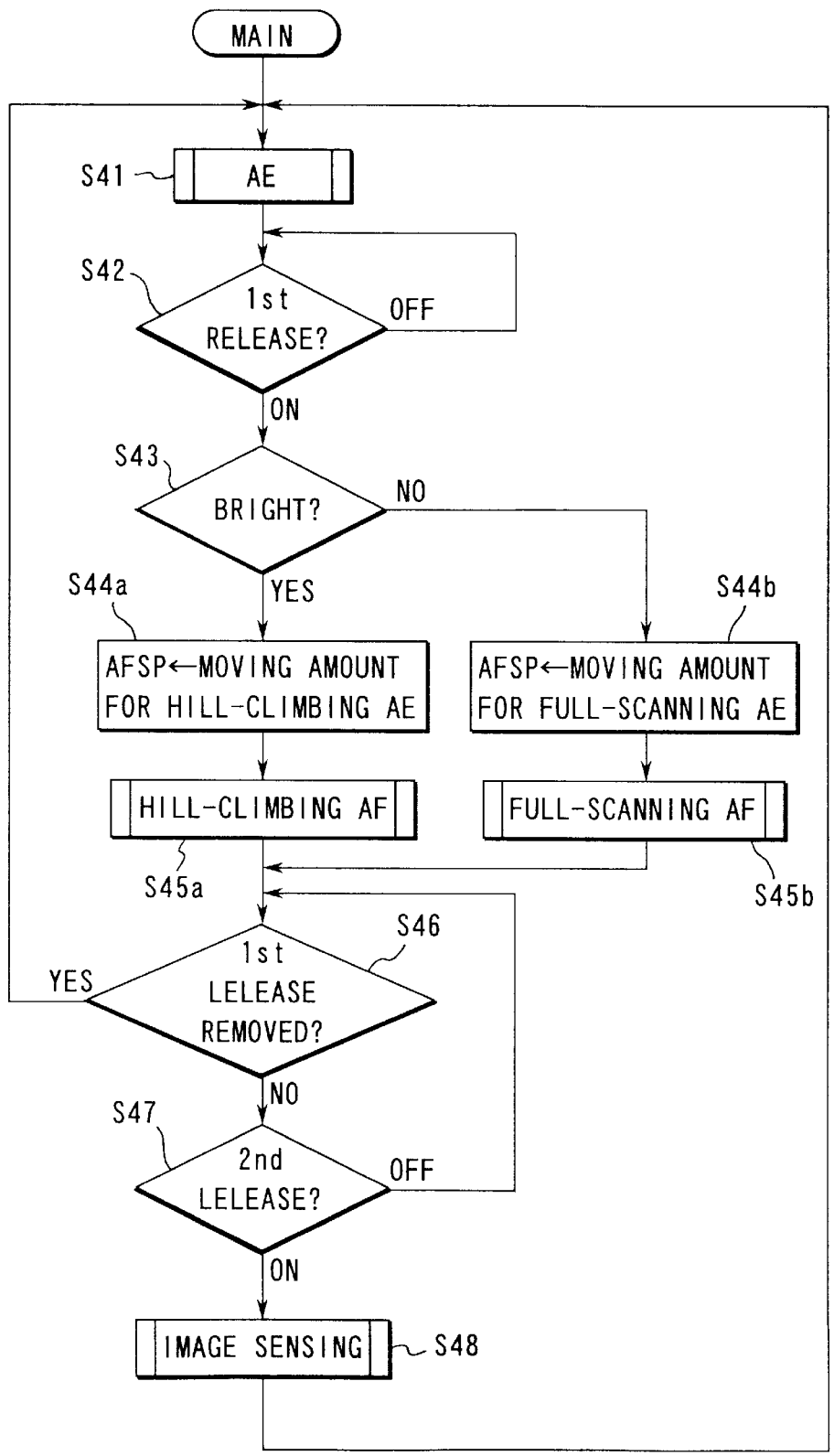
FIG. 7 is a flow chart representing the process according to the third embodiment of the present invention.

The processes from step S41 to S43 in FIG. 7 are the same as that of the steps from step S41 to S43 shown in FIG. 3.

When the subject is determined in step S43 to be bright, the moving distance of the lens for one frame in the hill-climbing AF is set in step S44a as a moving distance variable AFSP. Then, the hill-climbing AF is performed in step S45a.

When the subject is determined in step S43 to be dark, the moving distance of the lens for one frame in the full-scanning AF is set as the moving distance variable AFSP in step S44b, then the full-scanning AF is performed in step S45b.

In the present embodiment, the moving distance for the hill-climbing AF is set larger than that of the full-scanning AF. Since the hill-climbing AF is intended to increase the focusing speed, the moving distance of the focal lens 3 for one frame is set large. In the full-scanning AF, since the focusing precision is attached importance, the moving distance of the focal lens 3 for one frame is set small.

After the auto-focusing was performed according to one of the methods, the processes from step S46 to step S48 are performed. The operation of the processes from step S46 to step S48 is the same as that of the operation from step S6 to step S8 in FIG. 3, and thus the description thereof is omitted here.

According to the present embodiment, when the subject is bright, a high-speed AF is performed, so that the AF precision is not deteriorated even when the subject is dark. Accordingly, the easy-of-use AF can be realized.

Next, the fourth embodiment of the present invention will be described below with reference to FIG. 8. The auto-focusing process according to the present embodiment is free from the influence of flicker even if the subject is bright, and when the subject is dark, a highly precise auto-focusing process can be attained.

Figure 8:
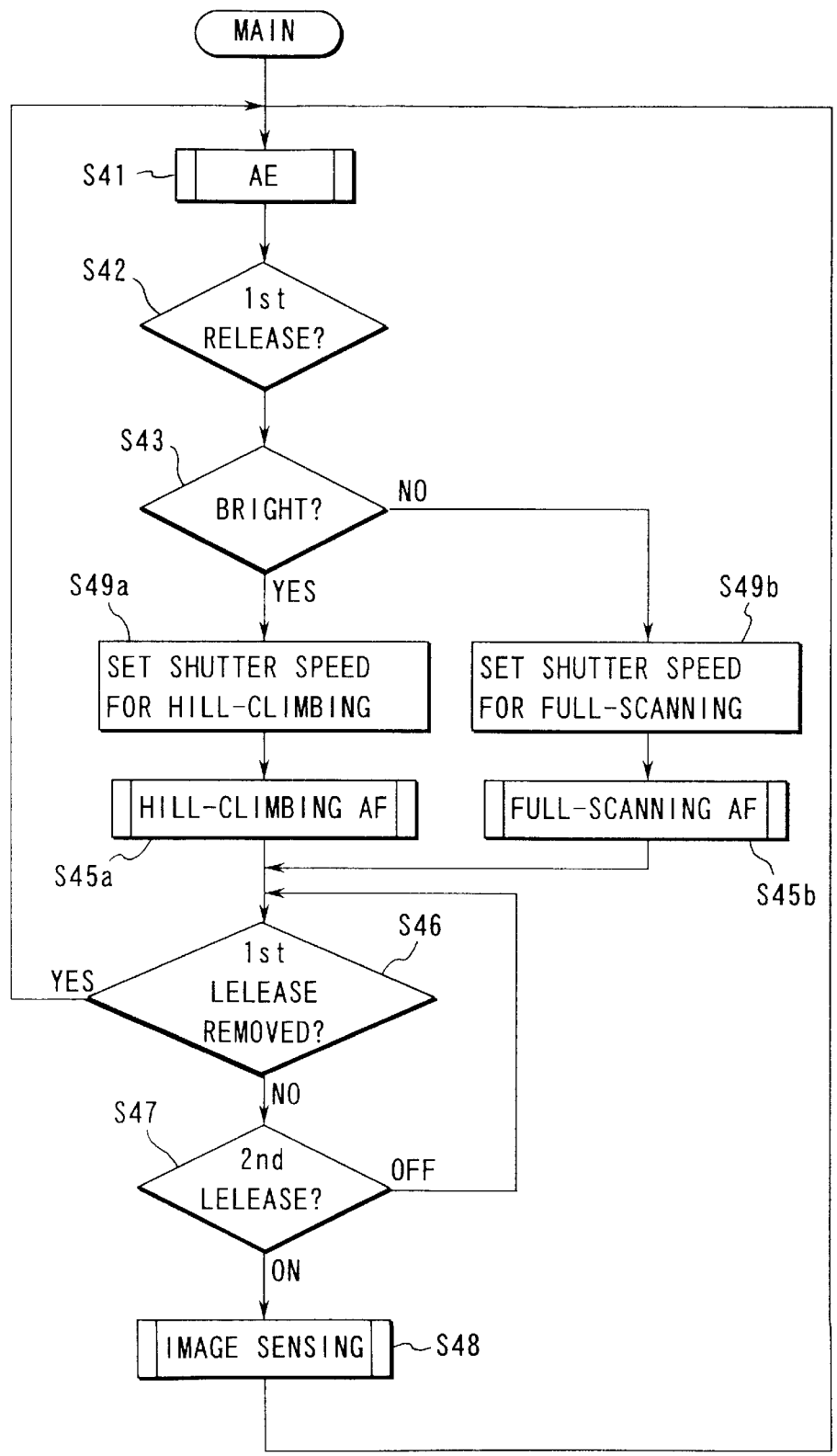
FIG. 8 is a flow chart representing the process according to the fourth embodiment of the present invention.

In the process represented by the flow chart of FIG. 8, steps S49a and 49b are performed instead of the steps S44a and S44b of the process shown in FIG. 7.

When the subject is determined to be bright, the shutter speed is set at the level for the hill-climbing AF in step S49a, and the hill-climbing AF is performed in the next step S45a. The shutter speed for the hill-climbing AF is determined in synchronization with a period of a time (1/100 second) equal to a half of the frequency 50 Hz assigned to a commercial power source which generates the flicker noise, or a period of a time (1/100 second, 1/50 second or the like) as the multiplication of 50 Hz by an integral number at which the flicker noise is not generated.

When the subject is determined to be dark, the shutter speed is set in step S49b at the shutter speed for the full-scanning AF, and then the full-scanning AF is performed in the next step S45b. The full-scanning AF is performed when the subject is dark, the shutter speed at this time is set to be equal to the frame rate (1/60 second or 1/30 second) so as to be lower than the shutter speed at which the flicker is not generated.

According to the present embodiment, the AF free from the influence of the flicker can be attained when the subject is bright, and when the subject is dark, the AF information is precisely obtained to improve the AF precision. As a result, the operability of the camera is improved.

Next, the fifth embodiment of the present invention will be described below with reference to FIG. 9. In the present embodiment, the auto-focusing apparatus is constituted to prevent the spurious focusing when the full-scanning AF is performed. The full-scanning AF shown in FIG. 9 can be applied to the full-scanning AF described in the above-mentioned embodiments.

Figure 9:
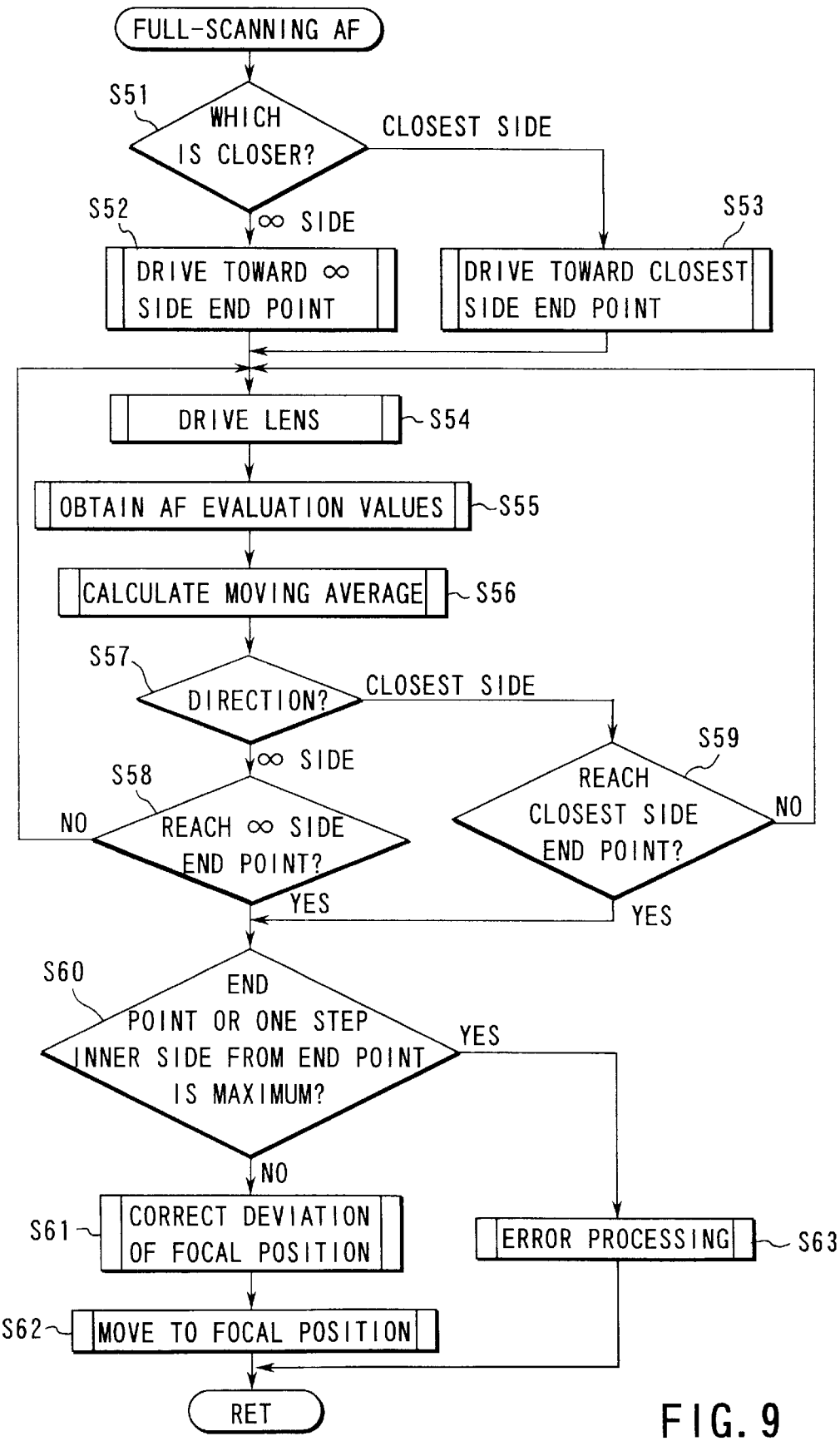
FIG. 9 is a flow chart representing the process according to the fifth embodiment of the present invention.

As shown in FIG. 9, when the full-scanning AF process starts, it is determined as indicated in step S51 which of the end points is nearer to the present lens position. When the lens position is located near the ∞ side (end point), the focal lens 3 is moved to the ∞ side end point, as indicated in step S52.

When the lens position is located near the closest side (end point), the focal lens 3 is moved to the closest side end point, as indicated in step S53. After moving the focal lens 3 to either of the end points in this manner, the steps from step S54 to step S59 are repeated. The AF evaluation values are obtained while the lens is moved at a predetermined distance till the lens reaches from the closest side end point to the ∞ side end point, or from the ∞ side end point to the closest side end point.

As indicated in step S54, the lens is moved at a predetermined moving distance (a moving distance equal to the stepping distance by which the lens moves for one frame), and the AF evaluation value at the moved point is obtained as represented in the next step S55. After the moving average is calculated in the next step S56, it is detected in step S57 what direction the lens moves. When the lens is detected to move toward the ∞ end point side, it is determined in step S58 whether or not the lens reaches the ∞ side end point. When the lens is determined in step S57 to move toward the closest end point side, it is determined in step S59 whether or not the lens reaches the closest side end point. This process is repeated till the lens reaches from one of the end points to the other of the end points.

After performing this process till the lens reaches from one of the end points to the other of the end points, it is determined in the next step S60 whether or not the AF evaluation value obtained at the end point the lens reached and the point one distance inner from the end point (inner point by a moving distance corresponding to one pulse rotation of a pulse motor for moving the lens, for example) is the maximum. When the AF evaluation value is not the maximum, the process for correcting the deviation of the focal point as indicated in step S61, then the lens is moved to the focal point.

When it is determined in step S60 that the AF evaluation value at the end point the lens reached and the point one distance inner from the end point is the maximum, an error processing is performed in step S63 as an error indication by blinking the LED or locking of the release switch to inhibit the image pickup. The full-scanning AF process is then completed.

Figure 10A:
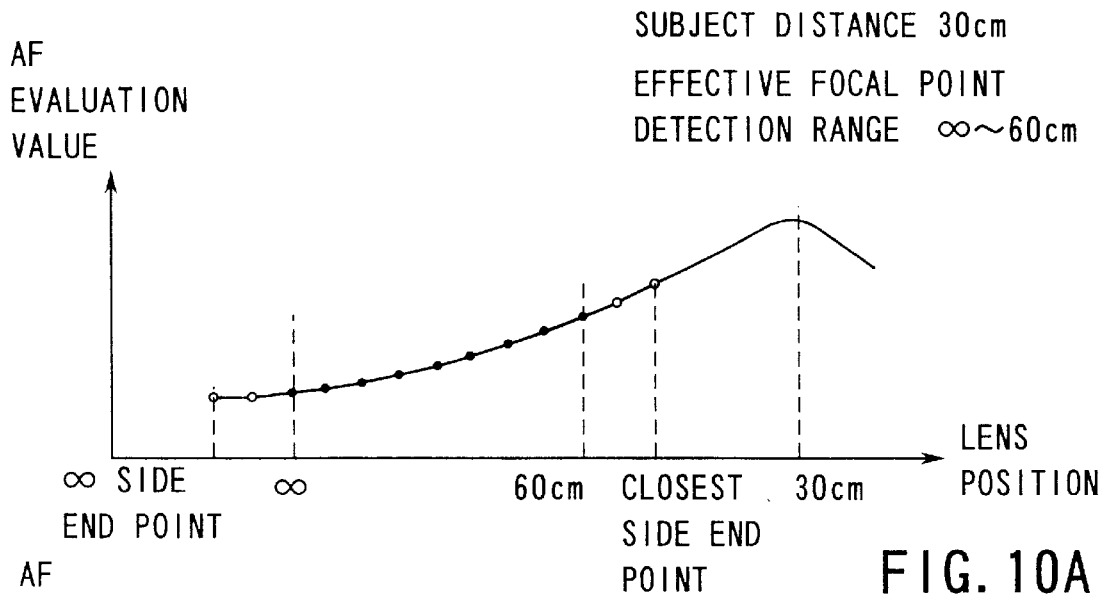
FIGS. 10A, 10B and 10C are graphs showing the operations in the fifth embodiment.
Figure 10B:
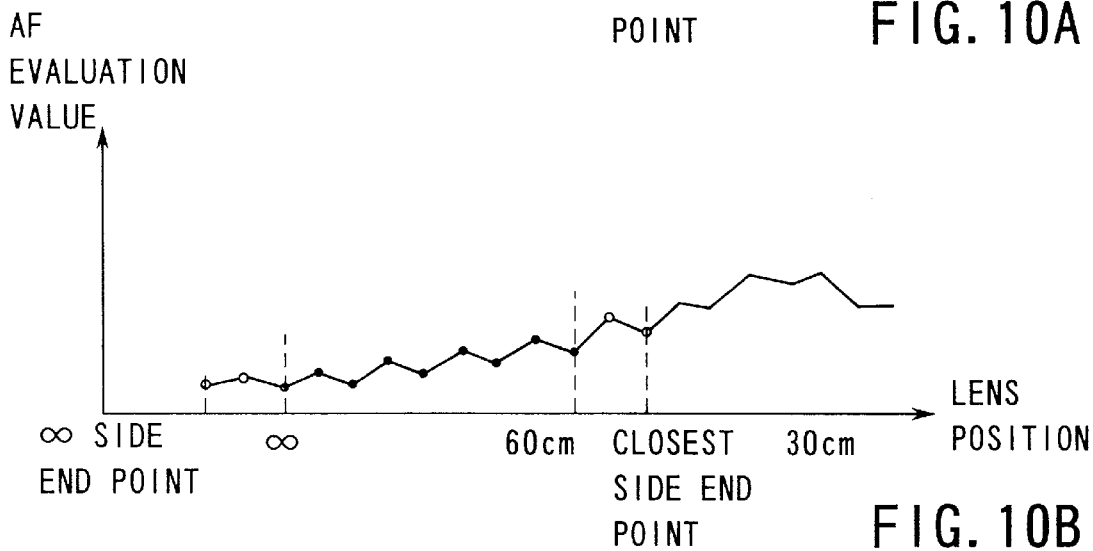
Figure 10C:
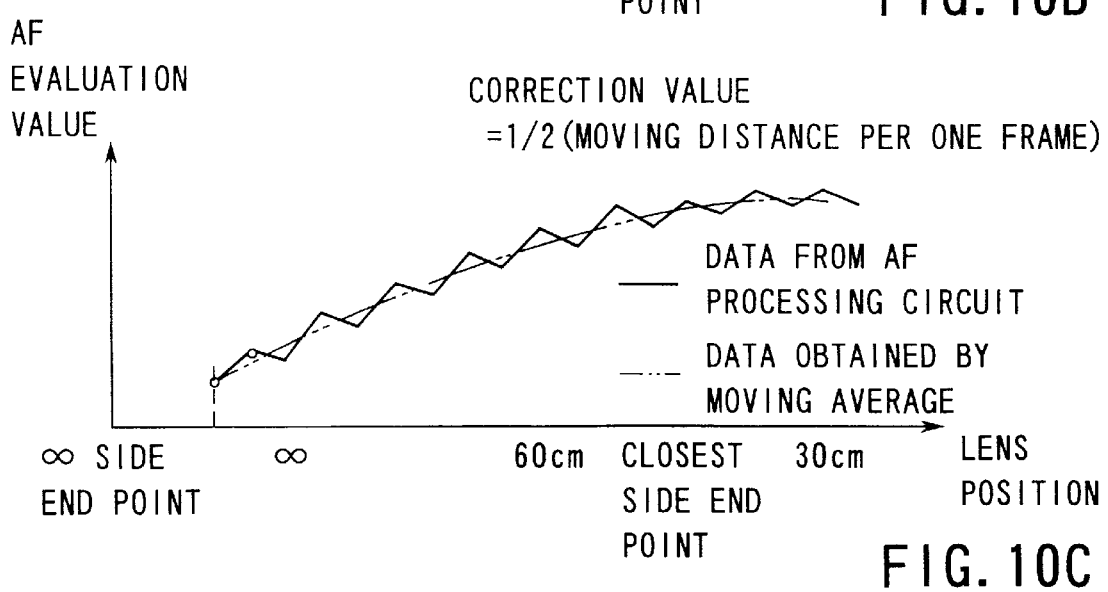

The present embodiment is basically intended to perform the moving average calculation process between the processes of step S25 and step S26 in the full-scanning AF process shown in FIG. 5, thereby obtain more reliable data (AF evaluation value) from the AF processing circuit 14 in comparing with the data for which the moving average calculation is not performed as shown in FIG. 10C.

According to the moving average calculation, the AF evaluation value itself is not used, but the average value of the obtained N AF evaluation values is used as the AF evaluation value. According to this method, when the AF evaluation fluctuates, the fluctuated AF evaluation value is smoothened to obtain gentle change of the AF evaluation value.

More specifically, when M AF evaluation values are obtained, the average value Yn at the lens position n is represented as $\Sigma Xi/M$. In this time, $\Sigma$ represents the total value Xi of the AF evaluation values obtained from the initial lens position (i=0) to the (M−1)th lens position (i=M−1).

In FIG. 5, after the full-scanning is performed from one end point to the other point to obtain the AF evaluation value at each of the moved points, the lens is moved to the lens position at which the AF evaluation value is the maximum (i.e., the focal point). In the present embodiment, however, a case for obtaining focusing by moving the lens to the end point and the point one distance inner from the end point at which the AF evaluation value is the maximum is excluded. When it corresponds to the position, the focal point deviation correction for correcting the deviation of the lens position due to the moving average is performed, and then the lens is moved to the focal point.

In the moving average calculation as described above, the obtained average value is the average of the total of the AF evaluation values obtained from the initial point to the point one former of the measured point, not to the practical measured point (lens position). The focal point deviation correction is thus performed to shift the practical measured point by a half of a pitch distance between the measured points (the moving distance of the lens for one frame).

FIGS. 10A and 10B schematically show the case except for the case where the focusing is attained when the lens is moved to the end point and the one distance inner position from the end point at which the AF evaluation value is the maximum. FIG. 10A shows the case where the full-scanning AF is performed to obtain the AF evaluation values at moved points when the subject distance is 30 cm, for example, and the effective focus detection range within which the AF process can be practically attained is from ∞ to 60 cm. As shown in this case, the movable range of the lens is set wider than the effective focus detection range by the two lens moving distances, for example.

When the practical subject distance is deviated from the scanning range, the maximum AF evaluation value is obtained at the end point (in FIG. 10A, the closest side end point) on the side of which the practical subject distance is deviated. In practical scanning, however, the focal position is located outside the end point, and thus when the AF evaluation value is the maximum at the end point, it is determined that it is not a focal position but an error.

Further, the full-scanning AF is often performed when the subject is dark, and the AF evaluation value obtained at each lens position thus includes error. The curve of this case has apparently similar characteristics to that of the bright subject as shown in FIG. 10A in general, as shown in FIG. 10B. The curve of the AF evaluation values in this case is, however, fluctuated due to the errors at each lens position. Due to the error components, the magnitude relationship of the AF evaluation values obtained at each of the adjacent lens positions may deviate from the case having no error. In order to prevent this, where the AF evaluation value obtained at the lens point one distance inner from the end point is maximum, the position is not regarded as the focal point, but it is determined as the AF error.

According to the present embodiment, even if the AF evaluation values are fluctuated due to the influence of the noise or the like when the subject is dark, a highly precise AF evaluation value can be obtained with little influence of the noise or the like by performing the moving average calculation. In this manner, the lens can be arranged at the focal point with high precision.

Further, when the focal lens 3 is moved by the full-scanning within the entire movable range and the AF evaluation value is calculated by the moving average calculation, the focal lens 3 is moved to the lens position at which the AF evaluation value is the maximum to obtain the focal point, and the deviation of the lens position due to the moving average calculation is corrected. The focal point can be thus attained with higher precision in comparing the conventional case.

In addition, according to the present embodiment, the case where the AF evaluation value is the maximum at the end point and the lens position one distance inner from the end point in scanning the movable range of the focal lens 3 is excluded from the focusing state, and thus the spurious focusing at the end point and the lens position one distance inner from the end point or the spurious focusing due to noise can be prevented.

The moving average calculation process and the focal point deviation correction process in the full-scanning AF have been described above. These processes can be applied also to the hill-climbing AF, when the moving direction of the focal lens 3 is known.

In the first embodiment, the hill-climbing AF and the full-scanning AF are selectively used in accordance with the brightness of the subject. When the auto-focusing process is performed by, for example, the hill-climbing AF method in a brightness more than a predetermined brightness, there is provided determining means for determining whether or not the obtained AF evaluation value reaches near the peak of the hill-climbing curve (of AF evaluation value), for example. When the determining means determines that the obtained AF evaluation value is close to the peak of the AF evaluation value, the AF evaluation value may be obtained by widening the aperture of the iris to shallow the depth of field, and correcting the widened amount of the aperture.

By performing the above-mentioned process, the depth of field near the focal point can be shallower, and thus a focal point can be detected with higher precision in comparing with the conventional case. The determining means for determining whether or not the AF evaluation value is close to its peak may determines whether or not the difference between adjacent AF evaluation values sequentially obtained along a hill-climbing direction decreases continuously twice or more and that the AF evaluation value attains neat the hill-climbing crest.

When the auto-focusing is performed in the full-scanning AF, the aperture of the iris may be widened to its full width to possibly improve an S/N ratio in obtaining the AF evaluation values at the lens positions.

The present invention also includes embodiments obtained from combinations of parts of the above-mentioned embodiments.

As described above, according to the auto-focusing apparatus of the present invention, when the subject is bright, the hill-climbing AF is performed, and when the subject is dark, the full-scanning AF is performed. In this manner, the present invention switches the AF methods in accordance with the brightness of the subject, and thus the AF of high speed and high precision can be realized.

When the hill-climbing AF is preferentially performed and it is determined that the focusing is disabled, the full-scanning AF is performed subsequently. In this manner, the AF can be performed without fail.

Further, according to a camera for switching the hill-climbing AF and the full-scanning AF in accordance with the brightness of the subject, the moving distance of the focal lens for one frame is set long in the hill-climbing AF since the hill-climbing AF is intended to increase the focusing speed, and the moving distance of the focal lens of one frame is set short in the full-scanning AF since the full-scanning AF is intended to improve the focusing precision. Therefore, an easy-to-use AF is realized wherein the AF can be performed at a high speed when the subject is bright, and the focusing precision is not deteriorated even if the subject is dark.

In the camera for switching the hill-climbing AF and the full-scanning AF in accordance with the brightness of the subject, the shutter speed (1/100 second or 1/50 second) at which no flicker is generated is selected in the hill-climbing AF since the hill-climbing AF is selected when the subject is bright. In the full-scanning AF, the lowest shutter speed, i.e., the shutter speed equal to the frame rate (1/60 second or 1/30 second) is selected since the full-scanning AF is performed for the dark subject. Accordingly, the AF is free from the influence of flicker when the subject is bright, and when the subject is dark, the AF information can be precisely obtained to improve the focusing precision. Accordingly, the camera can be used with ease.

In the full-scanning AF in which the scanning is performed also outside of the effective focus detection range within which the auto-focusing is attained, it can be determined that the AF error occurs when the maximum one of the obtained AF evaluation values is located at the end point or the adjacent point one distance inner from the end point, and thus the spurious focusing can be prevented.

Also, the AF evaluation value obtained by the moving average calculation is used as the AF evaluation value for the AF, and thus the process cannot be easily affected by noise, and the spurious focusing can be prevented in comparing with the case using the AF evaluation values serially output from the AF processing section.

In the full-scanning AF, the value obtained by the moving average calculation is used as the AF evaluation value, and thus the AF process cannot be easily affected by noise, and thus the spurious focusing can be prevented in comparing with the AF evaluation values serially output from the AF processing section.

Also in the hill-climbing AF in which the moving direction of the lens is known, the value obtained by subjecting, to a moving average calculation, the AF evaluation values obtained serially from the AF processing section is used as the AF evaluation value, so that it has a strong resilience against noise, and the spurious focusing can be prevented thereby.

Further, the value obtained by subjecting, to a moving average calculation, the input AF evaluation values is used as the AF evaluation value for the AF controlling, and the deviation of the focal point due to the moving average calculation is corrected, and thus highly precise focal point without deviation of the lens position due to the moving average calculation can be attained in comparing with the conventional apparatus.

As described above, according to the present invention, the auto-focusing process according to the hill-climbing method is performed when the subject is bright, and when the subject is dark, the auto-focusing process according to the full-scanning method is performed. In other words, the present invention selectively employs more suitable one of the auto-focusing methods in accordance with (the brightness of) the subject, and thus when the subject is bright, the auto-focusing can be performed at a high speed with high precision according to the hill-climbing method, and even if the subject is dark, a highly precise auto-focusing can be performed.

Additional advantages and modifications will readily occurs to those skilled in the art. Therefore, the invention in its broader aspects is not limited to the specific details and representative embodiments shown and described herein. Accordingly, various modifications may be made without departing from the spirit or range of the general inventive concept as defined by the appended claims and their equivalents.

What is claimed is:

1. An auto-focusing apparatus comprising:
    a determination section for determining a brightness of a subject by comparing the brightness of the subject with a predetermined brightness; and
    an auto-focusing section for performing an auto-focusing according to a hill-climbing method when the brightness of the subject is higher than the predetermined brightness, and when the brightness of the subject is lower than the predetermined brightness, performing an auto-focusing according to a full-scanning method.

2. The auto-focusing apparatus according to claim 1, wherein the auto-focusing section performs preferentially the auto-focusing process according to the hill-climbing method, and the auto-focusing process according to the full-scanning method when the auto-focusing process according to the hill-climbing method is determined to end in failure.

3. The auto-focusing apparatus according to claim 1, wherein the auto-focusing section includes means for increasing a moving distance of a focal lens for one frame in the auto-focusing according to the hill-climbing method which is intended to increase a focusing speed, and decreasing the moving distance of the focal lens for one frame in the auto-focusing process according to the full-scanning method which is intended to improve focusing precision.

4. The auto-focusing apparatus according to claim 1, wherein the auto-focusing section employs a shutter speed free from any flicker in the auto-focusing process according to the hill-climbing method, and in the auto-focusing process according to the full-scanning method, employs a lowest shutter speed equal to an frame rate.

5. The auto-focusing apparatus according to claim 1, wherein, in the auto-focusing according to the full-scanning method in which scanning is performed also outside of an effective focus detection range within which the auto-focusing can be attained, the auto-focusing section determines that the auto-focusing is impossible to be performed when the maximum evaluation value among the auto-focusing evaluation values obtained in the scanning corresponds to one end point of a movable range of the focal lens and a lens position adjacent to the one end point.

6. The auto-focusing apparatus according to claim 1, wherein the auto-focusing section has an auto-focusing processing section for serially generating the auto-focusing evaluation values in accordance with the movement of the focal lens, a resultant value of a moving average calculation of the auto-focusing evaluation values serially obtained from the auto-focusing processing section is used as an auto-focusing evaluation value for the auto-focusing.

7. The auto-focusing apparatus according to claim 6, wherein deviation due to the moving average calculation of the auto-focusing evaluation values is corrected to obtain a focal position.

8. The auto-focusing apparatus according to claim 1, wherein the auto-focusing section has an auto-focusing processing section for generating serially the auto-focusing evaluation values in accordance with precision of the focal lens, and a resultant value of a moving average calculation of the auto-focusing evaluation values serially obtained by the auto-focusing processing section is used as an auto-focusing evaluation value for auto-focusing, in the auto-focusing process according to the full-scanning method.

9. The auto-focusing apparatus according to claim 1, wherein the auto-focusing section has an auto-focusing processing section for serially generating the auto-focusing evaluation values in accordance with precision of the focal lens, and a resultant value of a moving average calculation of the auto-focusing evaluation values serially obtained by the auto-focusing processing section is used as an auto-focusing evaluation value for auto-focusing if a moving direction of the focal lens is known, in the auto-focusing process according to the hill-climbing method.

* * * * *